(12) United States Patent
Cotter

(10) Patent No.: US 7,561,522 B1
(45) Date of Patent: Jul. 14, 2009

(54) COMMUNICATIONS NETWORK HAVING MECHANISM FOR REMOVAL OF TIME-EXPIRED PACKETS FROM THE NETWORK

(75) Inventor: David Cotter, Suffolk (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 09/959,280

(22) PCT Filed: May 5, 2000

(86) PCT No.: PCT/GB00/01716

§ 371 (c)(1),
(2), (4) Date: Oct. 19, 2001

(87) PCT Pub. No.: WO00/69127

PCT Pub. Date: Nov. 16, 2000

(30) Foreign Application Priority Data

| May 11, 1999 | (EP) | 99303671 |
| Aug. 12, 1999 | (GB) | 9919095.1 |
| Dec. 22, 1999 | (GB) | 9930373.7 |

(51) Int. Cl.
*G06F 11/00* (2006.01)
(52) U.S. Cl. .......... 370/236; 370/235; 370/406
(58) Field of Classification Search .......... 370/229, 370/230, 235, 236, 351, 389, 391, 400, 406
See application file for complete search history.

(56) References Cited

U.S. PATENT DOCUMENTS

| 4,682,326 | A | | 7/1987 | Ulug | |
| 4,967,409 | A | * | 10/1990 | Narumiya et al. | 370/455 |
| 5,041,963 | A | | 8/1991 | Ebersole et al. | |
| 5,255,268 | A | * | 10/1993 | Cato et al. | 370/405 |
| 5,898,876 | A | * | 4/1999 | James | 709/251 |
| 6,161,138 | A | * | 12/2000 | Gross et al. | 709/225 |
| 6,731,648 | B1 | * | 5/2004 | Cotter | 370/458 |

* cited by examiner

*Primary Examiner*—Jason E Mattis
(74) *Attorney, Agent, or Firm*—Nixon & Vanderhye P.C.

(57) ABSTRACT

In a communications network, expired packets are recognized and removed by comparing a phase value received with the packet and a phase value previously received via the network on a master node. The packet is discarded when the difference between the value exceeds a predetermined amount.

22 Claims, 5 Drawing Sheets

COMMUNICATIONS NETWORK HAVING MECHANISM FOR REMOVAL OF TIME-EXPIRED PACKETS FROM THE NETWORK

BACKGROUND

1. Field of Invention

The present invention relates to a communications network and, in particular, to a mechanism for the removal of expired packets from such a network.

2. Description of Related Art

An important requirement for packet network is a "time-to-live" mechanism for causing time-expired packets to be purged from the network. For example, this mechanism may be used to purge packets that have a faulty address field, or packets addressed to a non-existent or malfunctioning node. One commonly adopted approach, used for example in Internet protocol, is to have a TTL (time-to-live) field in a packet header. In a ring network, TTL is set initially to the number of nodes in the ring. At each subsequent node, the TTL field is decremented by one, until the point is reached at which TTL equals zero. At this point, the packet is purged from the ring network by the node. This simple mechanism is suitable for packets that are processed at each intermediate router. However, the need to modify a header field at every intermediate node passed by a packet, is a serious disadvantage for high-speed networks, where it is desirable to minimise the processing of packets at intermediate nodes. An alternative approach, which does not require modification of the packet headers in transit, is to place a time-stamp in the header field when the packet is first created. Each node in the network then is required to maintain a synchronised clock. By comparing the packet-time-stamp with the local synchronised clock, each node is able to determine whether a packet's lifetime has expired. However, this approach again has drawbacks in the context of a high-speed packet network. In such a network, use of this mechanism requires very precise synchronisation of clocks at all the network nodes, for example, in the case of a ring network, to within a fraction of the speed-of-light transit time around the ring. It also requires relatively complex processing of the packets to read the packet-time-stamp and to compare it with a local instantaneous clock value.

BRIEF SUMMARY OF EXEMPLARY NON-LIMITING EMBODIMENTS OF THE INVENTION

According to the first aspect of the present invention, there is provided a method of removing expired packets from a communications network, characterised by comparing a phase value received with the packet with a phase value previously received via the network from a master node, and discarding the packet when the difference between the phase values exceeds a predetermined amount.

According to a second aspect of the present invention, there is provided a method of operating a communications network including:

(a) transmitting from a master node onto a cyclical transmission path, a packet carrying a phase field value;

(b) reading the phase field value at intermediate nodes on the cyclical transmission path;

(c) at the master node, incrementing the phase field value and outputting a further packet carrying the incremented phase field value;

(d) iterating steps (a) to (c);

(e) subsequently, when transmitting a packet from one of the nodes, transmitting with the packet a current local value of the phase field;

(f) on receiving the packet transmitted in step (e) at another node, comparing the value of the phase field received from the master node with the value carried in the packet, and discarding the packet if the values differ by more than a predetermined amount.

The invention provides a new time-to-live mechanism that does not require modification of a header field and that does not require complex synchronisation or processing. The invention is therefore particularly suitable for use with high-speed packets. Packets are created with a phase field value, such as the PH field described in the examples below. The phase field value indicates the current time "phase". A control packet output by a master node may travel around the network to inform each node of a new phase value. The phase value at each node is thus regularly updated. The updating of the phase value may be by incrementing the value by 1 (modulo 3). When a node determines that the phase value carried with a packet received at the node differs from the last phase value received from the master node by more than a predetermined amount, then the packet is treated as time-expired and is purged from the network.

Preferably the method includes transmitting at least some of the packets via one or more transit nodes on a continuous-flow transmission path.

As is further described below, a continuous-flow transmission path is one which transmits packets in a steady, continuous fashion without using queues or other variable delays. Preferably the packets are optical packets and the continuous-flow transmission path is a continuous optical path. Alternatively, part or all of the continuous-flow transmission path may be in the electrical domain. The intention also encompasses network nodes adapted to implement the method of the first aspect.

BRIEF SUMMARY OF THE DRAWINGS

Systems embodying the present invention will now be described in further detail with reference to the accompanying drawings in which.

DETAILED DESCRIPTION OF EXEMPLARY NON-LIMITING EMBODIMENTS

Figure 1:
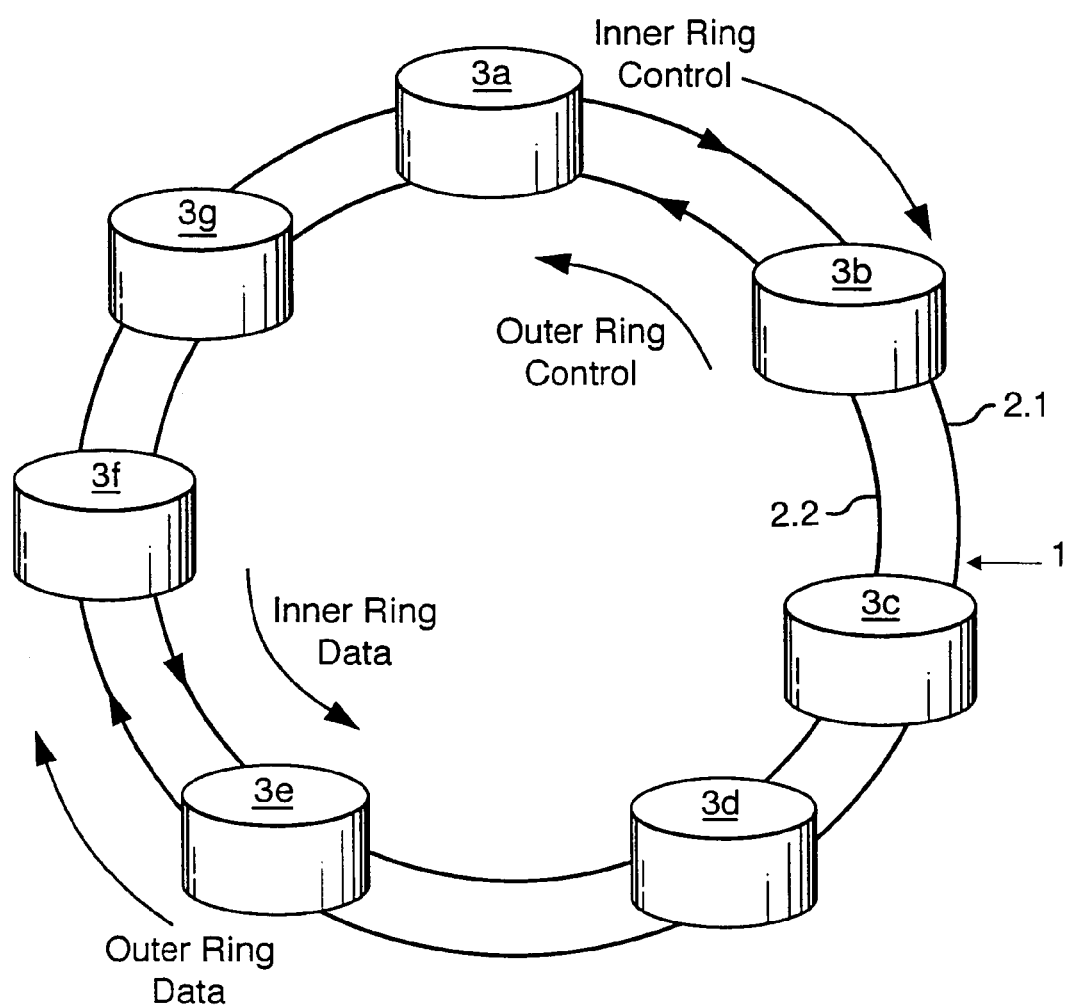
FIG. 1 is a schematic of a network embodying the present invention.

A communications network 1 comprises concentric outer and inner rings 2.1, 2.2. he rings carry optical packets. A number of nodes 3a to 3g are connected to the rings. In this example, each of the nodes 3a to 3g is an internet protocol router. In operation, one of the routers, for example 3a, outputs an optical packet addressed to another of the routers, for example 3d, onto one of the dual concentric rings. The optical packet output by node 3a carries the network address of node 3d in an address field in the packet header. The packet passes around the ring. At each intermediate node, the packet address is compared with the address of the respective node. If the packet is not addressed to a given intermediate node, then the packet passes on to the next node, and so on. At the destination node, the address is read and the packet is recognised as being intended for receipt at that node. The packet, in the case of a unicast transmission is removed from the network at that node. It may then, for example, be converted to the electrical domain for onwards transmission to a customer terminal on an electronic network connected to the respective node.

Figure 2:
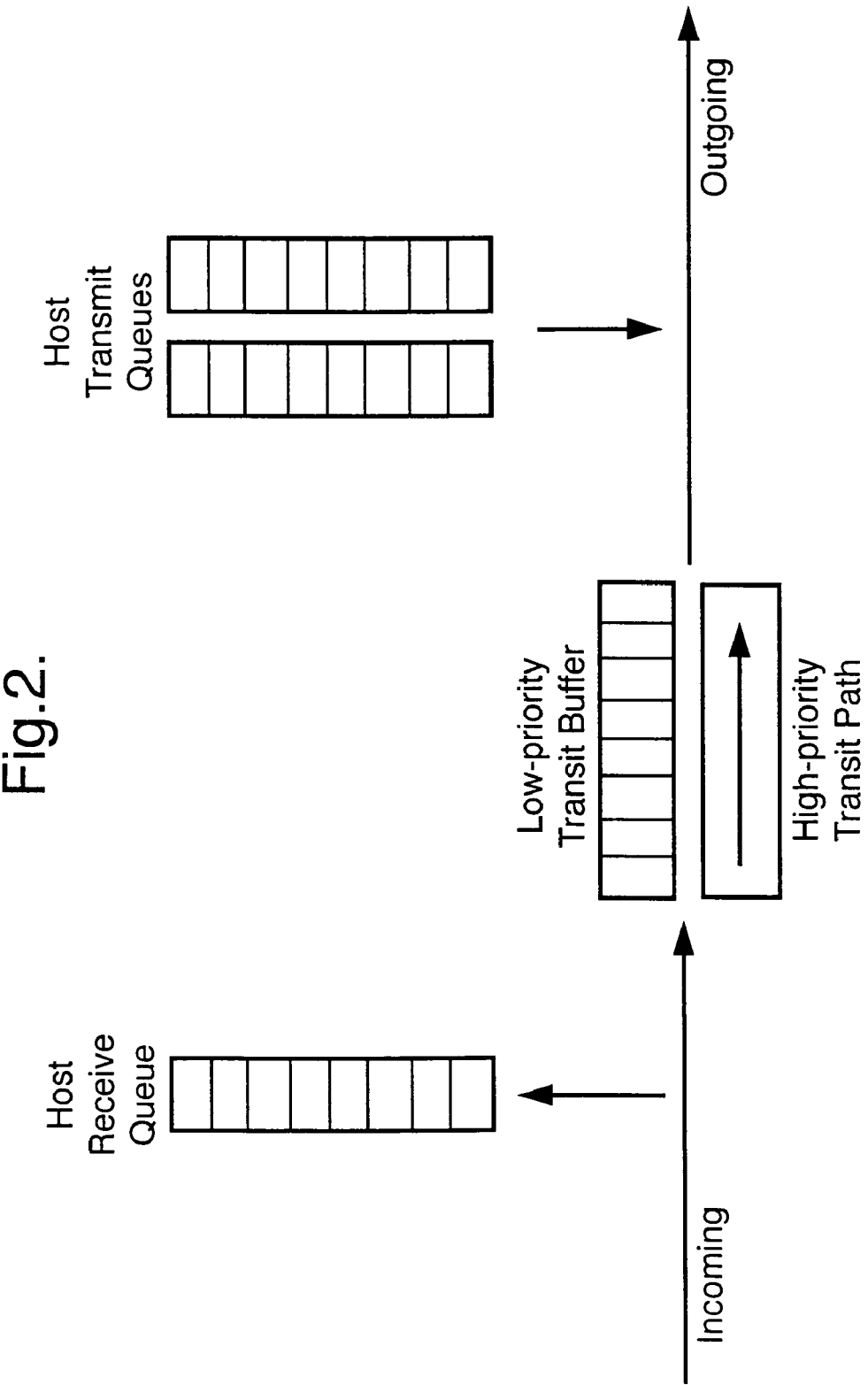
FIG. 2 is a diagram showing the flow of received and transmitted data packets through one of the nodes of the network of FIG. 1.

FIG. 2 shows the flow of received and transmitted data packets at one of the nodes on one of the fibre rings. An incoming data packet is (i) sent to host receive queue (if it has reached its destination) or (ii) is passed over for onward transmission. A multicast packet may both be sent to the host receive queue and also be forwarded for onward transmission. Packets for onward transmission are treated according to their priority: a low-priority packet is passed to a transit queue. An express high-priority, packet is passed immediately to the outgoing path without queuing. When capacity on the ring allows, a packet from one of the transmit queues may be passed to the outgoing path. Multiple transmit queues may be used to manage prioritisation of outgoing traffic from the node.

In this example, the optical fibre rings and the nodes are configured to provide a continuous optical path for express packets.

In a continuous transmission path signals stream into and out from the path at a continuous and uniform rate. The path may be a continuous optical transmission path. The continuous optical transmission path may contain a substantially fixed delay as in FIG. 3. In the case of a continuous transmission path in the electrical domain the path may contain storage elements such as FIFO (first-in first-out) buffer. The distinction from prior art systems, however, is that in this case, in normal operation, the output from the buffer is continuous and regular, so that the input and output of the buffer occur at substantially the same rate. This distinguishes from conventional prior systems where a buffer is used to hold transit packets in a queue which is serviced at rates and/or times which are dependent on factors such as packet priorities, queue length, status of contending queues etc.

Figure 3:
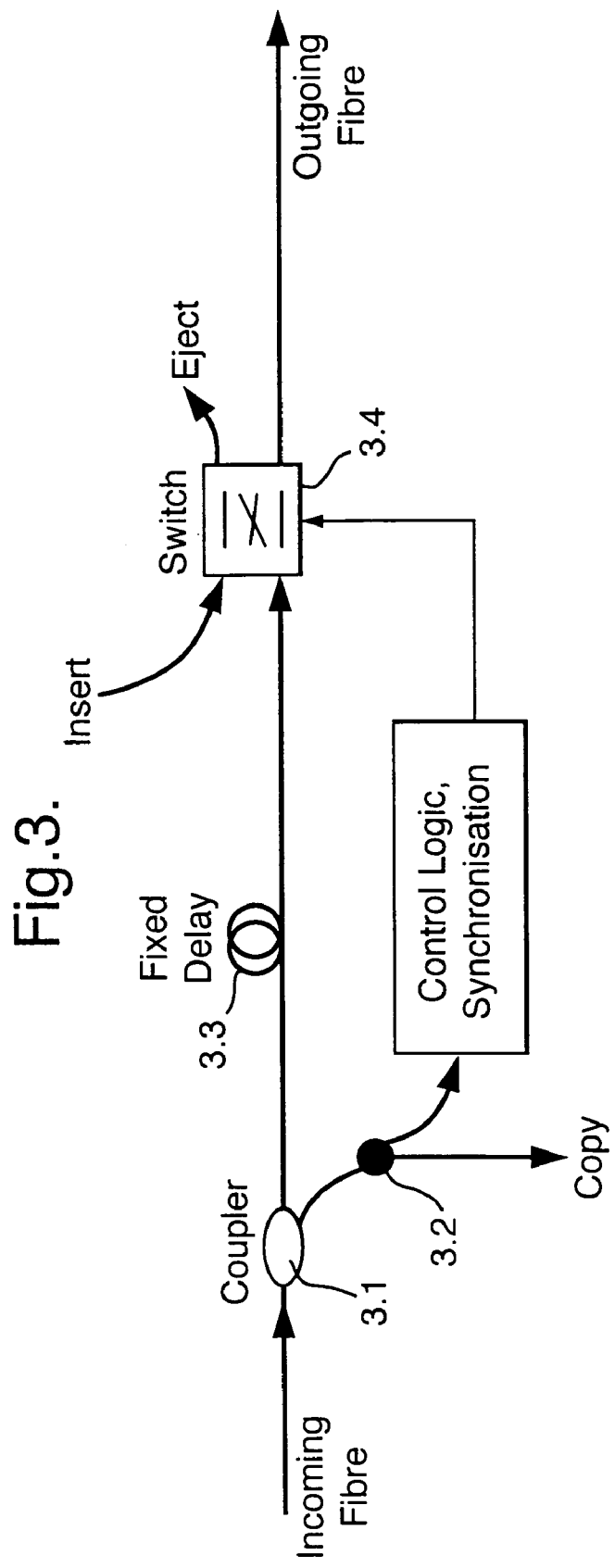
FIG. 3 shows a node's architecture implementing the data flow of FIG. 2.

FIG. 3 shows the node architecture developed by the inventors and term the "copy eject and insert" (CEI) architecture. An incoming fibre from one of the optical rings passes to a coupler 3.1. From the coupler 3.1, one optical path passes through a further length of fibre 3.3 providing a fixed delay to an optical crossbar switch 3.4. An outgoing fibre connected in the fibre ring passes from one of the output ports of the crossbar switch. The other output from the coupler 3.1 is split again, for example, using a further coupler 3.2. One branch of the output from this further coupler is used to provide a copy of the optical packet on the incoming fibre. This copy may be passed, for example, to the post receive queue. The other branch of the output of the further coupler passes to control circuits. These control circuits may, for example, read a header carried with the optical packet, and carry out associated logic operations. A control output is generated by the control circuits and passes to the crossbar switch. If the control circuits determine that the packet is addressed to the respective node, then the crossbar switch is set to the cross state in order to eject the packet (in the case of a unicast transmission).

A further function carried out by the control circuits is to determine whether the time-to-live (TTL) of a packet has expired. If the time-to-live is determined to have expired, then again a control signal is sent to the switch to cause such a packet to be ejected from the onwards transmission path.

When one of the nodes generates and outputs an optical packet onto the ring, a value is written in a phase field "PH" in the packet header. One of the nodes functions as a master node. The master node outputs multicast express control packets that travel around each ring to inform each node of the current phase value. The phase value is regularly updated, at a rate of at least once per round-trip time for express packet travel around the ring. The updating of the phase value is carried out by the master node incrementing the value by 1 (modulo 3). Each ring periodically receives and stores the current phase value as indicated by one of the multicast express control packets from the master node. When any other express packet is received at the node the control logic in the node determines whether the value in the PH field of the received express packet is such that:

$$(current\_phase-PH) \bmod 3 \geq 1,$$

If this inequality is satisfied, then the packet is expired and should be purged from the ring. This may be the case, for example, because the packet is addressed to a node which is currently malfunctioning or because there is an error in the address of the packet.

In this case an express packet that has completed one full revolution of the ring (and therefore should be purged) may over-run by between approximately 0 and 1 revolutions before being purged, with an average over-run distance of about 0.5 revolutions.

The PH header field may be a 2-bit field as follows:

PH=00 denotes the packet is an express packet created in phase 0; PH=01 denotes an express packet created in phase 1; PH=10 denotes an express packet created in phase 2; PH=11 denotes a low-priority packet (time of creation not indicated).

It is necessary for one of the nodes in the network to serve as a master node which maintains a modulo 3 counter for current_phase and creates the appropriate express control packets. For example, a control packet signalling that current_phase=0 is transmitted round the ring from the master node. On arrival back at the master node, this control packet is ejected and simultaneously a new control packet with value current_phase=1 is inserted onto the ring re-using the same time slot, and so on continuously. Any node may act as the master node for this purpose. The time-to-live mechanism operates independently on each of the two fibre rings, and there are independent master nodes for each of the two rings. Intermediate nodes that are being instructed by a master to update current_phase do so after inspection of an appropriate field in the multicast current_phase control packet indicates that this control packet is currently on the 'correct' ring. This ensures that the time-to-live mechanism is robust in a ring-wrap event.

When the network is first activated, or if the sequence of current_phase control packets is interrupted (for example due to a fault condition), the network nodes must 'elect' a master node. A suitable election mechanism is as follows: When a node detects that the sequence of current_phase control packets has been interrupted, it may transmit a multicast express control packet which signals a 'bid' to become the master node. The node may bid only if it has detected no other recent contending bids. If the node detects a current phase control packet or a contending bid before receiving back its own bid packet, then its own bid is void; in that case the node must wait a random time before it may submit a further bid subject to the rules above. If however a node receives back its own bid without being pre-empted, then it assumes it is duly 'elected' to serve as the master node; it purges all further counter bids and begins to transmit the sequence of current_phase control packets. If a master node detects a current phase control packet of which it is not the source, then it must cease acting as the master.

Figure 4:
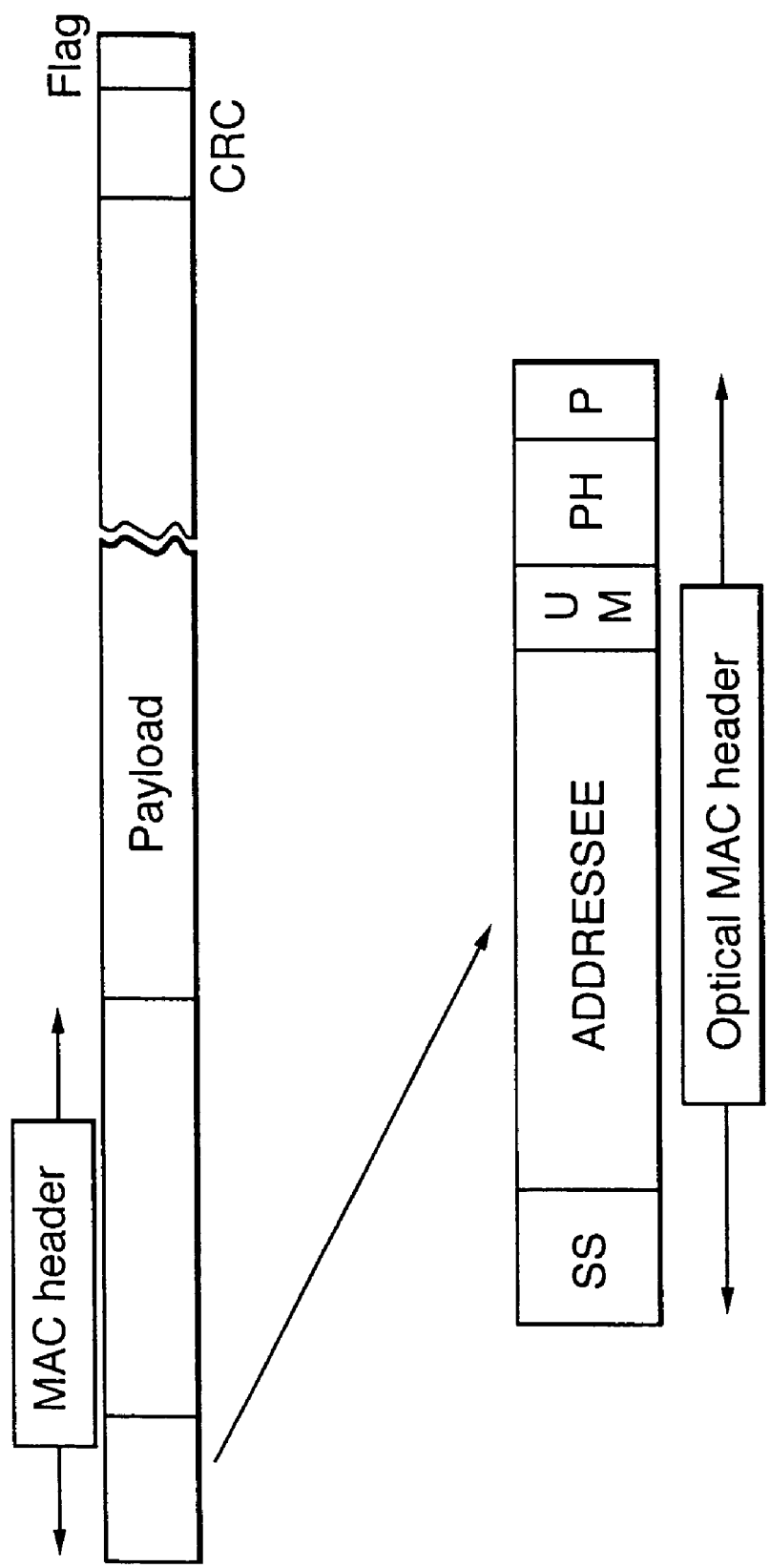
FIG. 4 is a schematic showing a packet transmitted on the network of FIG. 1.

In the present implementation, the phase field mechanism is used to determine the identity of time expired express packets and a separate mechanism is used for other low-priority packets. Such/low-priority packets are, as indicated above, identified by a specific value in the PH field. A conventional time-to-live mechanism may be used for low priority packets. For example, a counter value in a TTL field may be written elsewhere in the packet header and this value may be decremented by each node the packet passes through. When a node finds a packet with TTL=0, then the packet is purged. FIG. 4 shows the format of one of the optical packets including the PH field in the optical MAC header.

Figure 5:
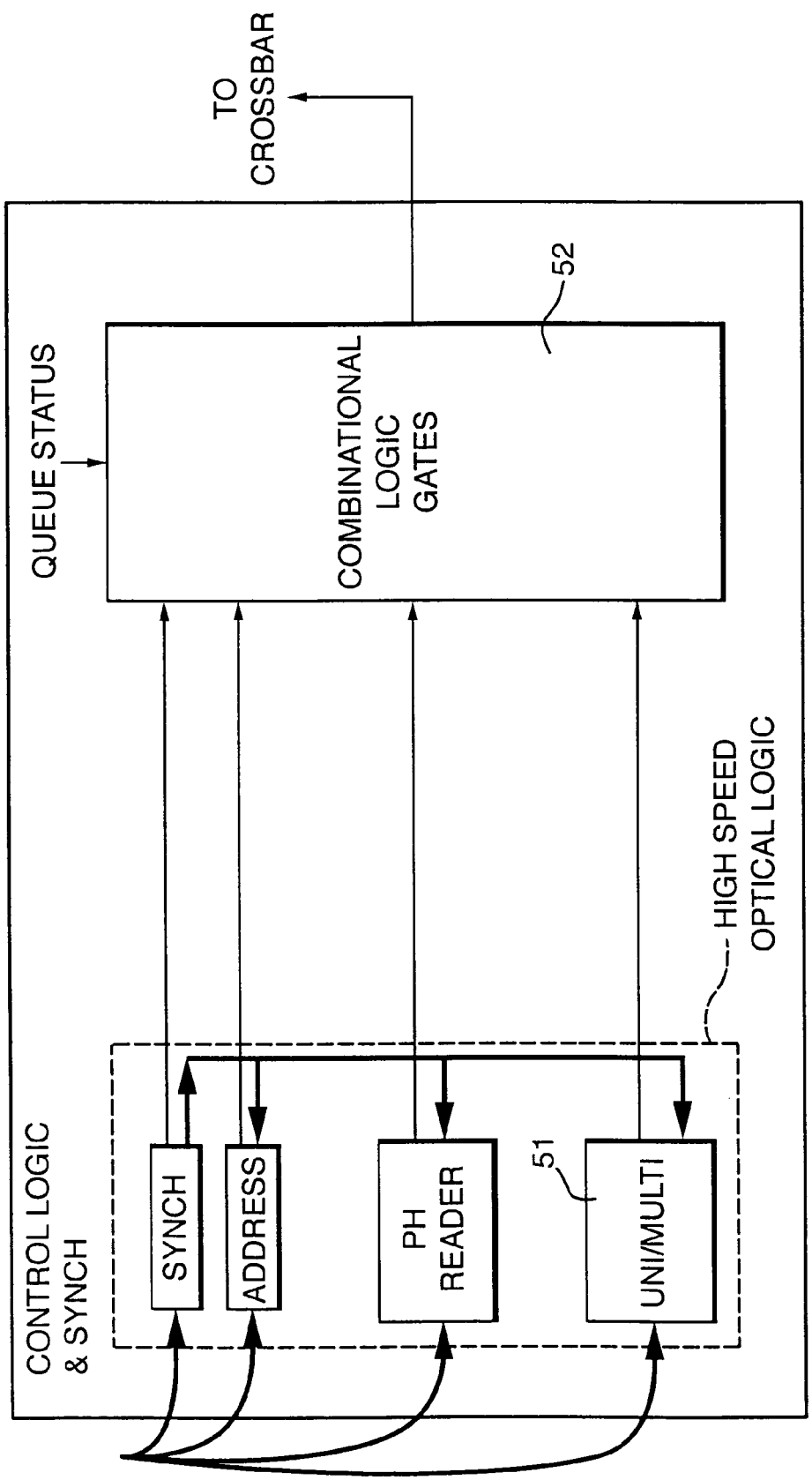
FIG. 5 shows a control and synchronisation subsystem for use in the node of FIG. 3.

FIG. 5 shows the control logic subsystem in more detail. It includes optical logic stages 51 and combinatorial electronic logic gates 52. The four optical blocks (synch, address recognition PH reader and Unicast/Multicast) each have copies of the optical packet to the input. The output from the synchronisation block is an optical path to each of the other three optical blocks. The synch block may be based on one of the self-synchronisation techniques we have described in our patent EP-B-687370 (eg. using pulses separated by 1.5 bit periods input to an optical AND gate). The address recognition block may be based on the technique we have described before in that patent. Addresses are coded using specially selected binary words, and recognised by inputting address and target word to an optical AND gate. The output from the AND gate is converted to give an output from the block that is an electrical binary signal that says packet ADDRESSEE matches/does not match local address. The PH may be two optical AND gates, each having the optical packet as one input and a synch pulse as the other input—this synch pulse timed to overlap with one of the PH bits. The output from PH reader block is two parallel electrical binary signals—each denoting one of the PH bits. The UNI/MULTI reader may be one optical AND gate, having the optical packet as one input and a synch pulse as the other input—this synch pulse timed to overlap with the UM bit. The output from UNI/MULTI reader block is one electrical binary signal—denoting unicast/multicast. These electrical signals, together with signals from the queue status then pass to the high-speed electronic logic part. This part performs the logic which is set out in—the table below describing the action of the node for various types of packet (e.g. multicast low-priority transit packet, etc). The output from this electronic logic is a binary electrical signal to set the 2×2 cross bar optical switch configuration.

Each stage of this logic has to operate within a time shorter than the shortest packet. e.g. for a 50 byte packet at 100 Gbit/s=4 ns. Since the optical stage and electronic logic stage are arranged in pipeline, each stage would have to take less than the minimum time (eg 4 ns). The optical stage is ultrafast—e.g. using four-wave mixing in semiconductor optical amplifier, or TOAD device, etc. to implement the optical AND gate. Since the electronic logic required is simple it is possible to construct suitable fast circuit using hard-wired combinatorial logic.

Although the example described above uses an optical network having a ring topology, it will be understood that this is shown by way of example only, and that other topologies and other networks, for example electronic networks, may be used without departing from the scope of the invention. The invention is also applicable to hybrid electro-optical systems. Furthermore, the invention may be used in a network carrying wavelength-multiplexed optical signals.

What is claimed is:

1. A method of removing expired packets which are erroneously addressed or addressed to a non-existent or malfunctioning destination node from a communications network, the network including a plurality of nodes arranged in a node sequential order, wherein each expired packet has an expired packet current time phase value associated therewith, the method comprising:
   associating in the node sequential order, each of the plurality of nodes with a current time phase value, wherein associating each of the plurality of nodes with the current time phase value comprises transmission by a master node of a control packet carrying the current time phase value to each of the plurality of nodes in the node sequential order, and wherein the control packet carrying the current time phase value is transmitted from the master node upon arrival at the master node of an earlier control packet carrying an earlier current time phase value;
   comparing, at one of the plurality of nodes, the expired packet current time phase value received with the expired packet with the current time phase value held by the node at the time of receipt at the node of the expired packet current time phase value, and
   discarding the expired packet if the difference between the current time phase value held by the node and the expired packet current time phase value exceeds a predetermined amount.

2. A method according to claim 1, including transmitting at least some of the expired packets via one or more transit nodes on a continuous-flow transmission path.

3. A method according to claim 1 including transmitting on the network packets having a relatively lower priority, and other packets having a relatively higher priority, and at a node on the network, discriminating between the packets having relatively higher and relatively lower priorities, and directing only packets having relatively higher priorities onwards via a continuous flow transmission path.

4. A method as in claim 1, wherein the plurality of nodes, including a master node, are coupled together to form a ring communications network, and the current time phase value held by the node is updated on a regular basis.

5. A method according to claim 1, wherein none of the plurality of nodes modifies the expired current time phase value.

6. A method of operating a communications network comprising:
   (a) transmitting from a master node onto a cyclical transmission path, a control packet carrying a current time phase value in a phase field;
   (b) reading the current time phase value in a node sequential order at intermediate nodes in a node sequential order on the cyclical transmission path;
   (c) upon arrival at the master node of a control packet carrying the current time phase value, incrementing the current time phase value to an updated current time phase value, and outputting a packet carrying the updated current time phase value;
   (d) iterating steps (a) to (c) using the updated current time phase value;
   (e) subsequently, when transmitting an expired packet erroneously addressed or addressed to a non-existent or malfunctioning destination node from one of the nodes, transmitting with the expired packet an expired packet current local time phase value in the phase field; and
   (f) on receiving an expired packet at a node, comparing the current time phase value held at the node at the time of receipt at the node of the expired packet current time phase value with the expired packet current local time phase value received with the expired packet, and discarding the expired packet if the current local time phase value held by the node and the expired packet current time phase value differ by more than a predetermined amount.

7. A method according to claim 6, including transmitting at least some of the expired packets via one or more transit nodes on a continuous flow transmission path.

8. A method according to claim 6 including transmitting on the network packets having a relatively lower priority, and other packets having a relatively higher priority, and at a node on the network, discriminating between the packets having relatively higher and relatively lower priorities, and directing only packets having relatively higher priorities onwards via a continuous flow transmission path.

9. A method according to claim 6, wherein none of the plurality of the nodes modifies the expired packet current local time phase value.

10. A method according to claim 6, wherein the node for comparing the current time phase value held by the node with the expired packet current local current time phase value is a non-master node.

11. A method of removing expired packets from a communications network, wherein each packet has a phase value associated therewith, characterised by comparing a phase value received with the packet and a phase value previously received via the network from a master node, and discarding the packet when the difference between the values exceeds a predetermined amount;
wherein comparing the value of the phase received from the master node with a value carried in a packet is only carried out for higher priority packets, and an alternative time-to-live mechanism is employed for lower priority packets.

12. A node for connection in a communications network as one of a plurality of nodes arranged in a node sequential order, the network having a master node, the node comprising: a phase field reader arranged to read a current time phase value carried by packet received at the node, including an expired packet current time phase value carried by an expired packet erroneously addressed or addressed to a non-existent or malfunctioning destination node, wherein in operation a control packet carrying the current time phase value is transmitted from the master node upon arrival thereat of a control packet carrying an earlier current time phase value, the control packet carrying the current time phase value being received in the node sequential order, the node being arranged to discard the expired packet if the difference between the current time phase value held by the node and the expired packet current time phase value is greater than a predetermined amount.

13. A communications network including at least one cyclical transmission path and a node according to claim 12 connected to the at least one cyclical transmission path.

14. A node as in claim 12, wherein none of the plurality of the nodes modifies the expired packet current time phase value.

15. A method of removing expired packets which are erroneously addressed or addressed to a non-existent or malfunctioning destination node from a communications network including a plurality of nodes arranged in a node sequential order, each expired packet having an expired packet current time phase value indicating a current time phase value associated therewith, the method comprising:
comparing the expired packet current time phase value of the expired packet with a current time phase value held at one of the plurality of nodes, indicating a current time phase value previously received with one of a plurality of control packets via the network from a master node, the control packets being received by each of the plurality of nodes in the node sequential order to periodically update the current time phase value held by each of the plurality of nodes, the current time phase value being transmitted upon arrival at the master node of an earlier control packet carrying an earlier current time phase value; and
discarding the expired packet when the difference between the current time phase value held by the node and the expired packet current time phase value exceeds a predetermined amount.

16. A method as in claim 15, wherein the control packets are received to update the current time phase value held by each of the plurality of nodes.

17. A method according to claim 15, wherein none of the plurality of the nodes modifies the expired packet current time phase value.

18. A communications network including a plurality of nodes arranged in a node sequential order, comprising:
a master node arranged for the periodic transmission of a plurality of control packets each carrying a current time phase value onto a transmission path, each of the plurality of control packets being transmitted upon arrival at the master node of an earlier control packet carrying an earlier current time phase value; and
each one of a plurality of nodes arranged to receive the current time phase value from the plurality of control packets in the node sequential order from the master node via one of the control packets transmitted onto the transmission path to update the current time phase value held by each one of the plurality of nodes, and to read an expired packet current time phase value indicating a current time phase value carried by an expired packet received at the node, the expired packet being erroneously addressed or addressed to a non-existent or malfunctioning destination node, and to discard the expired packet if the difference between the current time phase value held at the node and the expired packet current time phase value is greater than a predetermined amount.

19. A communications network as in claim 18, wherein each of the plurality of nodes of the communications network are coupled together in a ring communications network, and the current time phase value is regularly updated.

20. A communications network as in claim 18, wherein none of the plurality of the nodes modifies the expired packet current time phase value.

21. A communications network as in claim 18, wherein each of the plurality of nodes receiving the current time phase value from the master node is a non-master node.

22. A method of removing expired packets from a communications network, wherein each packet has a phase value associated therewith, the method comprising:
comparing a phase value received with the packet and a phase value previously received via the network from a master node, and discarding the packet when the difference between the values exceeds a predetermined amount;
wherein comparing the value of the phase received from the master node with a value received with the packet is only carried out for packets passed immediately to the outgoing path without queuing, and an alternative time-to-live mechanism is employed for packets which are passed to a transit queue.

* * * * *